(12) United States Patent
Elmufdi et al.

(10) Patent No.: US 9,298,866 B1
(45) Date of Patent: Mar. 29, 2016

(54) METHOD AND SYSTEM FOR MODELING A FLIP-FLOP OF A USER DESIGN

(71) Applicant: Cadence Design Systems, Inc., San Jose, CA (US)

(72) Inventors: Beshara Elmufdi, San Jose, CA (US); Mitchell G. Poplack, San Jose, CA (US); Viktor Salitrennik, Berkeley, CA (US)

(73) Assignee: CADENCE DESIGN SYSTEMS INC., San Jose, CA (US)

( * ) Notice: Subject to any disclaimer, the term of this patent is extended or adjusted under 35 U.S.C. 154(b) by 0 days.

(21) Appl. No.: 14/501,699

(22) Filed: Sep. 30, 2014

(51) Int. Cl.
*G06F 17/50* (2006.01)

(52) U.S. Cl.
CPC ........ *G06F 17/5027* (2013.01); *G06F 2217/86* (2013.01)

(58) Field of Classification Search
CPC .............................................. H03K 19/17728
See application file for complete search history.

(56) References Cited

U.S. PATENT DOCUMENTS

| | | | |
|---|---|---|---|
| 7,378,869 B1 * | 5/2008 | Chirania et al. | 326/38 |
| 2006/0190237 A1 * | 8/2006 | Beausoleil et al. | 703/23 |

* cited by examiner

*Primary Examiner* — Vuthe Siek
*Assistant Examiner* — Aric Lin
(74) *Attorney, Agent, or Firm* — Kaye Scholer LLP

(57) ABSTRACT

The present patent document relates to a method and apparatus for modeling a flip-flop of a user's circuit design when that circuit design is mapped in a hardware functional verification system including a plurality of interconnected emulation chips, or in a single emulation chip. The flip flop can be modeled in the emulation chip as two stages using only a single instruction, and may be configured by programming a register set. A data block, enable block, and LUT block are provided to model the flip flop, and may operate in one of several modes, including combined and uncombined modes. The data block includes a data array to store and provide previous data inputs and previous states of the modeled flip flop. The disclosed embodiments allow a more efficient use of LUTs for modeling flip flops, including options for resets and global enables, operating in several modes.

20 Claims, 8 Drawing Sheets

METHOD AND SYSTEM FOR MODELING A FLIP-FLOP OF A USER DESIGN

FIELD

The present patent document relates generally to verifying the functionality of integrated circuit designs prior to fabrication. In particular, the present patent document relates to a method and apparatus for modeling a flip-flop of a user's circuit design under test ("DUT") in a hardware functional verification system.

BACKGROUND

Integrated circuit designs, such as those for modern system-on-a-chip ("SOC") devices, continue to grow is size and complexity. Shrinking transistor sizes mean that more and more transistors can be included in a circuit design once fabricated as an integrated circuit chip ("chip"), while a greater number of features or components can be packed on the chip. The chip may be any type of integrated circuit fabricated, whether on a single substrate or multiple interconnected substrates. Functional verification of such devices is usually included as part of the circuit design flow to help ensure that the fabricated device functions as intended.

The increasing size and complexity of the circuit designs to be verified (devices under test, "DUT," also known as designs under verification, "DUV") mean that the functional verification portion of the design cycle is increasing in length. The verification stage may in some case be the longest stage of the design cycle. For example, running a simulation on a host computer to verify a SOC, or even a sub-portion of the SOC, written in the register transfer language ("RTL") design abstraction may take anywhere from hours to days. Certain hardware functional verification systems may leverage high-performance hardware to increase the speed of the verification stage, including a plurality of interconnected processor chips. Such systems are also referred to as "emulators" herein.

FIG. 2 illustrates a generic D flip-flop 200, having a data input port D, an enable port E, a clock port, and a Q output port. The D flip-flop 200 tracks the D input, capturing the D input on a clock edge of the clock, which may be a rising edge, a falling edge, or another trigger. Output Q then outputs the stored D input after the clock edge. In other words the state of output Q tracks the state of data input D, but delayed by a clock cycle. Enable F enables, or not, the D flip flop. Such flip flops may also allow for the capability (not illustrated) to force the flip flop into a set or reset state, where the data D input and clock are ignored.

The circuit designs of a user's DUT to be mapped to the emulator frequently contain flip-flops ("user flops") that need to be implemented in an emulator during functional verification. Prior art processor-based emulators modeled user flops inefficiently. For example, the user flop models would need multiple memory locations to store the state of the user flop, and thus multiple instructions for the multiple memory locations. In addition, the models did not always allow for the modeling of the full functionality of a general purpose flip-flop, such as resets and global enables. Thus, a more efficient mechanism to model user flops in a processor-based emulator is desirable to increase emulation capacity and efficiency in such emulators.

SUMMARY

A method and apparatus for modeling a flip-flop of a user's circuit design in a hardware functional verification system is disclosed.

An embodiment is a processor-based hardware functional verification system into which a circuit design may be mapped, wherein the circuit design includes a flip flop to be modeled in an emulation chip of the system. The system comprises a data block to select one of a plurality of data inputs generated by a plurality of emulation processors of the hardware functional verification system as a current data input of the modeled flip flop, wherein the data block includes a data array to store a previously-selected data input of the modeled flip flop; an enable block to generate one or more enable signals; and a lookup table (LUT) block to generate a state output signal of the modeled flip flop according to the one or more enable signals.

Another embodiment is an emulation chip into which a portion of a circuit design may be mapped during functional verification, wherein the circuit design includes a flip flop to be modeled. The emulation chip comprises a data block to select one of a plurality of data inputs generated by a plurality of emulation processors of the emulation chip as a current data input of the modeled flip flop, wherein the data block, includes a data array to store a previously-selected data input of the modeled flip flop; an enable block to generate one or more enable signals; and a lookup table (LUT) block to generate a state output signal of the modeled flip flop according to the one or more enable signals.

According to another embodiment the data array further stores a previous output state of the modeled flip flop.

According to another embodiment the one or more enable signals comprise a state enable signal generated by a first LUT according to a first plurality of bits stored in a configuration register of the emulation chip.

According to another embodiment the LUT block further comprises a multiplexer to select one of a previous state of the modeled flip flop and a current state of the modeled flip flop.

According to another embodiment the one or more enable signals comprise a data enable signal generated by a second LUT according to a second plurality of bits stored in a configuration register of the emulation chip.

According to another embodiment the data block further comprises a multiplexer to select one of the selected data input and the previously-selected data input according to the data enable signal.

According to another embodiment the LUT block comprises two three-input LUTs. The first LUT provides the data and set/reset as a function of a plurality of flip-flop inputs for the modeled flip flop. The second LUT provides the enable signal as a function of a plurality of flip-flop inputs.

According to another embodiment the LUT block comprises a four-input LUT that provides the data and set/reset as a function of a plurality of flip-flop inputs for the modeled flip flop.

According to another embodiment the data block further comprises a multiplexer to select the one of a plurality of data inputs according to one or more selection bits, and one or more multiplexers to select the plurality of data inputs other than the one according to the one or more selection bits.

According to another embodiment the one or more enable signals comprise a data enable signal and a state enable signal generated by one or more LUTs according to a plurality of bits stored in a programmable configuration register.

Another embodiment is a method of modelling a flip flop of a circuit design mapped into a processor-based hardware functional verification system, wherein the system comprises a data block including a data array to store bits associated with the modelled flip flop, an enable block in communication with the data block, and a lookup table (LUT) block in communication with the data block and the enable block. The method comprises selecting as a current data input of the modeled flip flop one of a plurality of data inputs generated by a plurality of emulation processors of the system in the data block; generating a data enable signal in the enable block according to a plurality of configuration bits, and selecting in the data block one of a previously-selected data input of the modeled flip flop stored in the data array and the current data input of the modeled flip flop according to the data enable signal; and generating a current state of the modeled flip flop using at least the selected data input.

According to another embodiment the method further comprises generating a state enable signal in the enable block according to the plurality of configuration bits.

According to another embodiment the method further comprises selecting in the LUT block one of a previously output state of the modeled flip flop stored in the data array and the current state of the modeled flip flop according to the state enable signal.

According to another embodiment the method further comprises programming a configuration register with the plurality of configuration bits.

According to another embodiment the configuration bits comprise two words, wherein a first word is received by a first LUT of the enable block to generate the data enable signal, and wherein a second word is received by a second LUT of the enable block to generate a state enable signal.

According to another embodiment the method further comprises programming a register to determine the selection of one of a combined mode and an uncombined mode for the modeled flip flop.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
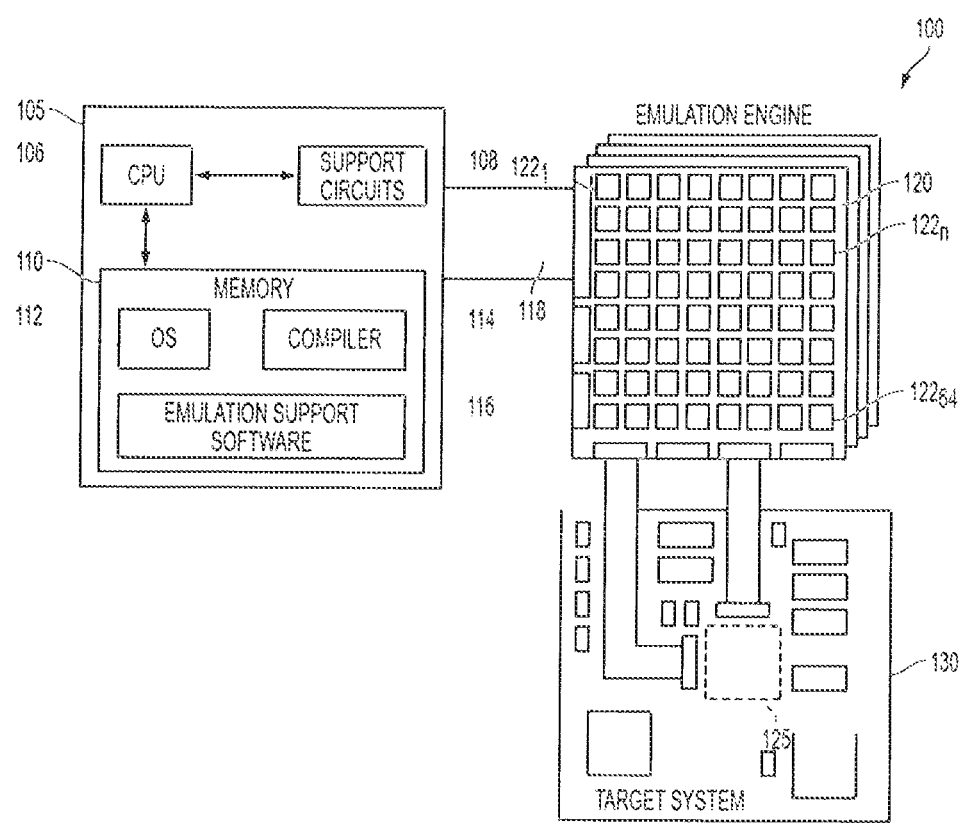
FIG. 1 is an illustration of an overview of a processor-based emulator (processor based hardware functional verification system).
Figure 2:
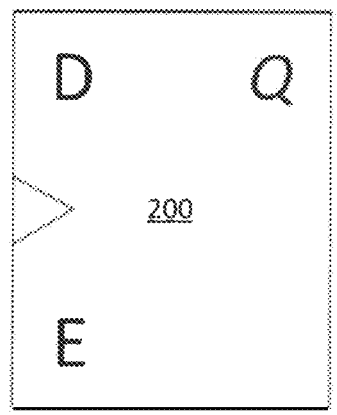
FIG. 2 illustrates a generic D flip-flop.

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method and apparatus for modeling a flip-flop of a user's design is disclosed. Each of the features and teachings disclosed herein can be utilized separately or in conjunction with other features and teachings. Representative, examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Typical functional verification systems, including hardware emulation systems and simulation acceleration systems, utilize interconnected programmable logic chips or interconnected processor chips. Examples of systems using programmable logic devices are disclosed in, for example, U.S. Pat. No. 6,009,256 entitled "Simulation/Emulation System and Method," U.S. Pat. No. 5,109,353 entitled "Apparatus for emulation of electronic hardware system," U.S. Pat. No. 5,036,473 entitled "Method of using electronically reconfigurable logic circuits," U.S. Pat. No. 5,475,830 entitled "Structure and method for providing a reconfigurable emulation circuit without hold time violations," and U.S. Pat. No. 5,960,191 entitled "Emulation system with time-multiplexed interconnect," U.S. Pat. Nos. 6,009,256, 5,109,353, 5,036,473, 5,475,830, and 5,960,191 are incorporated herein by reference. Examples of hardware logic emulation systems using processor chips are disclosed in, for example, U.S. Pat. No. 6,618,698 "Clustered processors in an emulation engine," U.S. Pat. No. 5,551,013 entitled "Multiprocessor for hardware emulation," U.S. Pat. No. 6,035,117 entitled "Tightly coupled emulation processors," and U.S. Pat. No. 6,051,030 entitled "Emulation module having planar array organization." U.S. Pat. Nos. 6,618,698, 5,551,013, 6,035,117, and 6,051,030 which are incorporated herein by reference.

FIG. 1 illustrate an overview of a processor-based emulation system 100, which may also be known as a processor-based hardware functional verification system, according to an embodiment. The system comprises a host or computer workstation 105, an emulation engine including emulation board 120, and a target system 130. Here a processor-based emulation engine is described, though other emulation engines, such as those utilizing arrays of programmable logic devices (such as FPGAs) may also be used, for example properly configured versions of the systems discussed above.

The host workstation 105 provides emulation support facilities to the emulation engine 100 and emulation board 120. The host workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116.

The compiler 114 converts a hardware design, such as hardware described in VHDL or Verilog, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to $122_{64}$ (collectively 122) shown in FIG. 1, in addition to miscellaneous support circuitry.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 3:
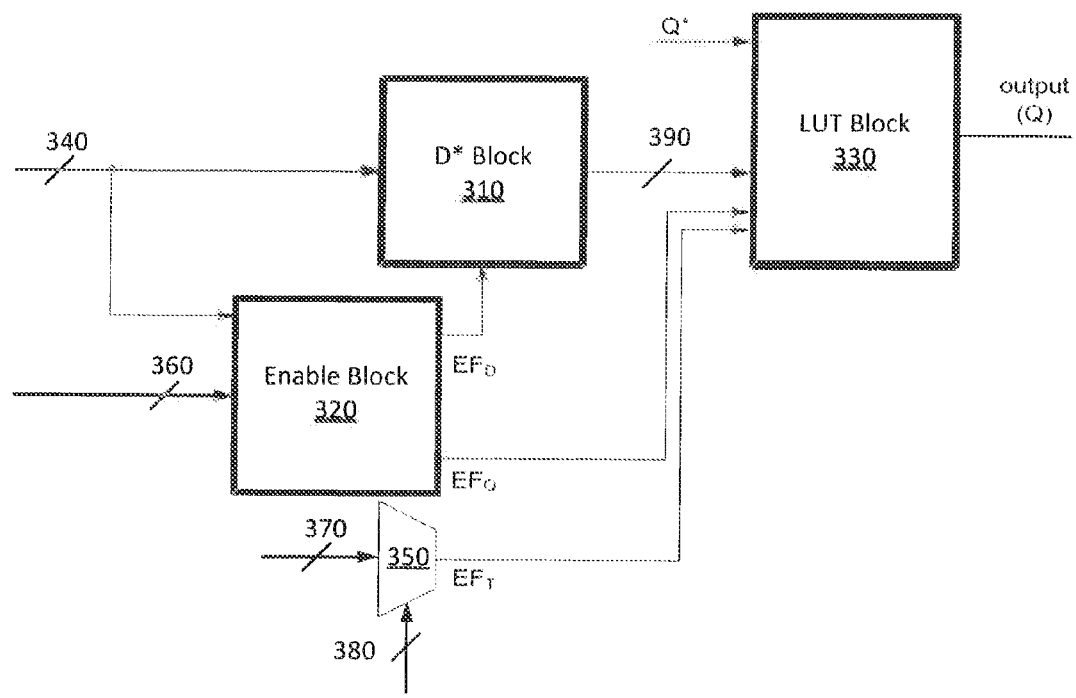
FIG. 3 illustrates a portion of an emulation chip within a processor-based emulation system according to an embodiment.

FIG. 3 illustrates a portion of an emulation chip $122n$ within the processor-based emulation system 100. Specifically, the hardware configuration 300 illustrated in FIG. 3 is found within an emulation chip and configured to allow the modeling of a user's flip flop during functional verification of the user's circuit design containing that flip flop. The hardware configuration 300 is just one of many found within a single emulation chip and the hardware may perform other functions in support of modeling a user's circuit design other than modeling a user's flip flop. In other words, the hardware allows for, but does not require, that it be used to model a user's flip flop.

Hardware configuration 300, when used to model a user's flip flop is conceptually divided into three functional blocks 310, 320, and 330, plus a multiplexer 350.

D* (or data) block. 310 receives at an input four signals 340. Input signals 340 may originate from any number of data arrays that store data output from the closest emulation processors, or data stored in more distant data arrays for other emulation processors that are routed to D* block using selection logic. Such selection logic may include a series of multiplexers that select data coming from a plurality of different data arrays for various emulation processors to provide the data to a different processor.

Of the four input signals 340, one of these inputs is D, i.e. the data input D for the user flop that is being modeled. D* is the previous data input of the flop. For a flip flop being modeled that uses an enable signal, one of these inputs will be the enable signal E. As described further below, it does not matter which input is D signal and which is E signal. Depending on the particular hardware configuration, there may be more or fewer than four inputs to D* block 310, but here there are four since the LUTs of the emulation processors are four-input LUTs.

D* block 310 sends four output signals 390 to LUT block 330, in the case where the LUT output 340 is four signals. If there are more or fewer than four input signals 340, there will be a corresponding more or fewer output signals 390. Depending on the value of the $EF_D$ control signal, D* block 310 either feeds the four LUT outputs 340 to the LUT block 330, or the D* and the three remaining LUT outputs 340 to the LUT block 330.

The enable block 320 generates signals $EF_D$ and $EF_Q$. $EF_D$, a data enable signal, controls whether D* block 310 stores the new value of D into D* array 430. Similarly, a state enable signal $EF_Q$ controls whether D* block 310 outputs the current state of the flop, Q, or the previous state of the flop, Q*. The enable block 320 likewise receives each of the LUT output signals 340 that include D and E. In addition, enable block 320 receives a number of other control signals 360, which will be described further below, which are used to generate $EF_D$ and $EF_Q$.

LUT Block 330 contains one or more LUTs and will generate the Q output corresponding to the Q output of the modeled flip flop. LUT block 330 receives the four output signals 390 from D* block 310, the control signal $EF_Q$, control signal $EF_T$, and Q*. Q* is the previous state of the modeled user's flip flop, which may be stored and provided by the general emulator data memory of the emulation chips $122_n$ that includes the hardware configuration 300.

Control signal $EF_T$ provides enable bits for the processor output. Multiplexer 350 outputs control signal $EF_T$, whose value is selected from a plurality of input control signals 370 according to the values of bits on a selection bus 380.

Figure 4:
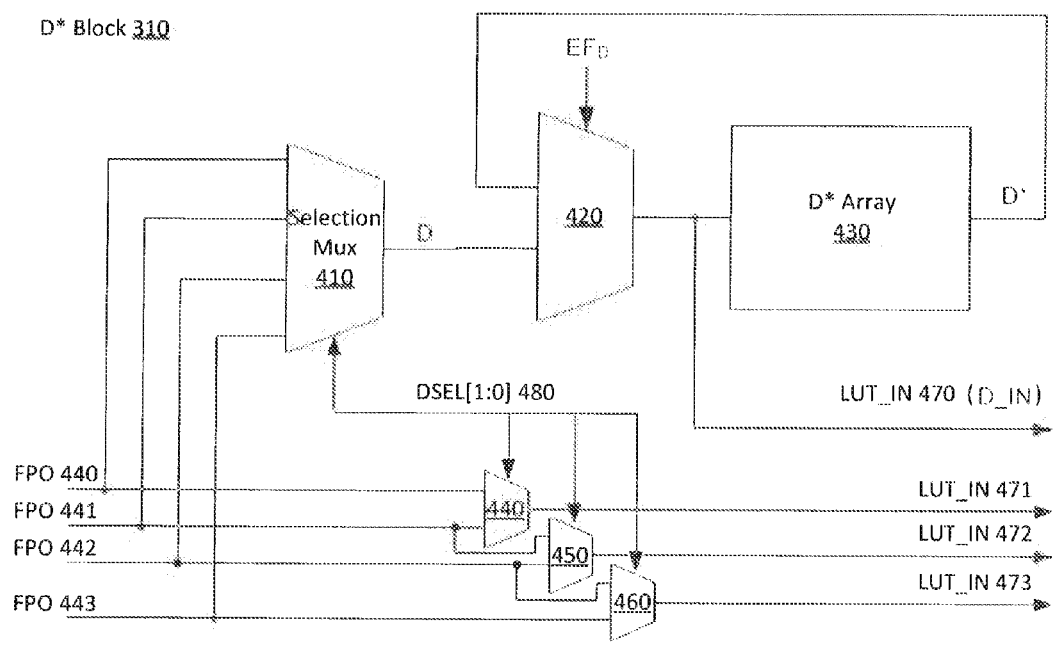
FIG. 4 illustrates a detailed view of a data (D*) block of the portion of the emulation chip.

FIG. 4 is a detailed view of D* block 310. Here, the input signals 340 illustrated in FIG. 3 are four data input signals FPO 440, FPO 441, FPO 442, and FPO 443, which are the outputs of various other LUT-based processors, routed from those processors to the D* block 310 using a series of multiplexers. Selection multiplexer 410 selects one of these input signals to be data input 1) according to a set of two selection bits DSEL[1:0] 480. Recall that D* Block 310 sends four output signals 390 to LUT block 330. The selection bits 480 also control three multiplexers 440, 450, and 460, that select the remaining three of the input signals FPO 440, FPO 441, FPO 442, and FPO 443 that are not selected by selection multiplexer 410 to output as inputs to LUT block 330 as signals LUT_IN 471, LUT_IN 472, and LUT_IN 473. The fourth output to LUT block 330 is DIN (or LUT_IN 470), which is either the current data input D or the previous data input D* as selected using multiplexer 420 according to select signal $EF_D$. D* array 430 is used to store the previous data input signal D. D* array 430 is a memory.

Figure 5:
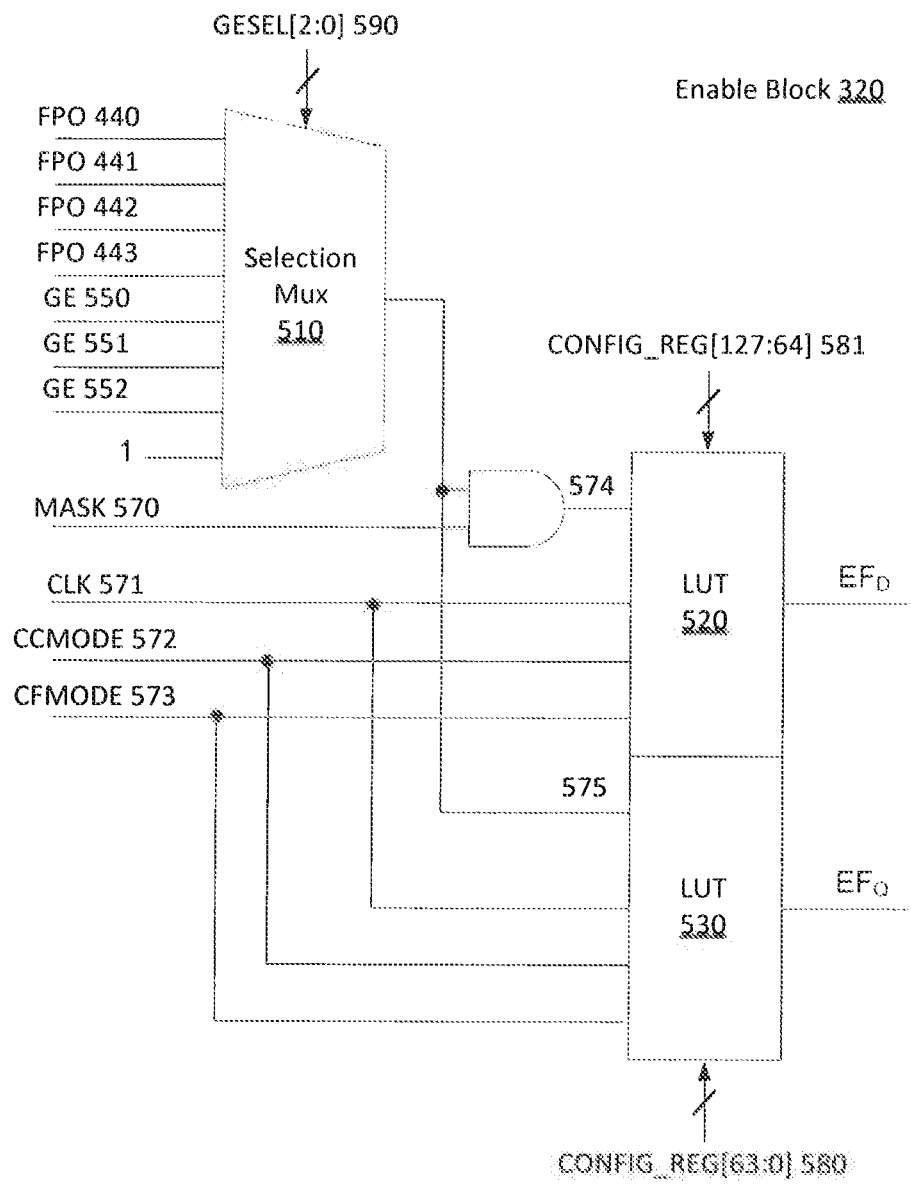
FIG. 5 illustrates a detailed view of an enable block of the portion of the emulation chip.

FIG. 5 is a detailed view of enable block 320. Enable block 320 generates enable signals $EF_D$ and $EF_Q$.

A six-input LUT 520 outputs the D enable signal $EF_D$ according to six select signals (the data inputs to the LUT), which are CLK 571 (1 bit), CCMODE 572 (2 bits), CFMODE 573 (2 bits), and an signal that is the AND function 574 of MASK 570 and the output 575 of selection multiplexer 510 (1 bit). CLK is a clock signal for the user flop. CCMODE 572 and CFMODE 573 specify various control modes, including the control mode for the user's flop. The two bits of CCMODE 572 and the two bits of CFMODE 573 may be specified in the configuration registers of a higher-level processor cluster. The function table input for LUT 520 is a sixty-four bit word CONFIG_REG[127:64] that is read from a configuration register.

A second six-input LUT 530 outputs the Q enable signal $EF_Q$ according to six select signals, which are CLK 571 (1 bit), CCMODE 572 (2 bits), CFMODE 573 (2 bits), and the output 575 of selection multiplexer 510 (1 bit). The function table input for LUT 530 is a sixty-four bit word CONFIG_REG[63:0] that is read from the configuration register for a higher-level processor cluster.

Selection multiplexer 510 selects from among eight inputs: FPO 440, FPO 441, FPO 442, and FPO 443 (which as described above are outputs of various other processors), global register enable signals 550, 551, and 552, and a fixed value of "1." The three bits used to select the inputs of the selection multiplexer 510 can originate in configuration registers for a cluster of processors for this portion of the emulation chip, and specified by the emulation system's compiler. Global enable signals, such as global register enable signals 550, 551, and 552, may be high fanout signals originating in the DUT or from instrumentation logic that affects many flip-flops to be modeled in an emulation chip of the emulation system. Providing a separate, high-fanout global enable signal frees routing resources that would otherwise be consumed by the flip-flops that need the enable signals.

Figure 6:
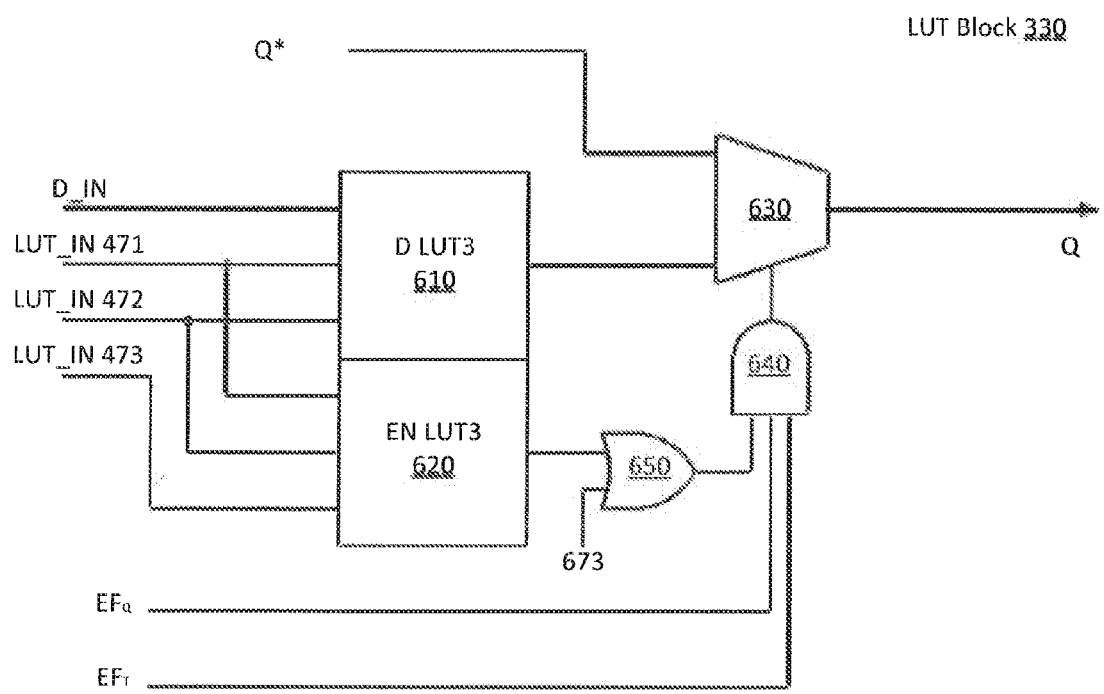
FIG. 6 illustrates a detailed view of a LUT block of the portion of the emulation chip.

FIG. 6 illustrates LUT block 330 according to an embodiment, which provides output Q corresponding to the Q output of the user's flip flop being modeled within the processor-based emulator.

D_IN (LUT_IN 470) is received from D* Block 310 as an input to the D LUT3 610, which is a three-input LUT. The other two inputs to D LUT3 610 are LUT_IN 471 and LUT_IN 472. Recall that LUT_IN 471 and LUT_IN 472 are two of the three FPO inputs (among FPO440, FPO441, FPO442, and FPO443) that were not selected to be the D input by selection multiplexer 410. D LUT3 610 generates an output signal according to its inputs and eight bits that are stored in configuration registers for a cluster of processors containing the LUT block 330. These configuration registers are programmable by the user of the emulation system.

The output enable signal of the enable LUT (EN LUT3 620) is determined according to its three inputs and another eight bits that are stored in configuration registers for a cluster of processors containing the LUT block 330. The three inputs to this enable block are LUT_IN 471, LUT_IN 472, and LUT_IN 473, each of the inputs that were not selected to be the D input by selection multiplexer 410.

Multiplexer 630 selects either the previous output of the user's flop Q* to output, or a new output generated by D LUT3 610, either of which is output as Q. That new output Q may then be stored as the next Q* value. The selection signal is provided by a three-input AND gate 640. Thus, the output of D LUT3 610 (the new value of Q, as opposed to Q*) is output to Q when all of the Q enable signal $EF_Q$, control signal $EF_T$, and the output of OR gate 650 are high (value "I"). OR gate 650 allows the EN LUT3 620 to be bypassed by driving signal 673 high.

FIG. 6 illustrates a LUT block in a combined user flip flop modeled in the emulator. This combined version of the LUT block 330 allows for the user to model the set and reset functionalities of a user's flip flop. EN LUT3 620 provides for configurable functionality. According to another configuration of the embodiment, LUT block 330 may be configured such that it is functionally replaced with LUT block 700 illustrated in FIG. 7 to provide a combined flip flop mode that does not provide set/reset functionality.

The inputs to LUT4 710 receives each of LUT_IN 470 (D_IN), LUT_IN 471, LUT_IN 472, and LUT_IN 473 as select signals. LUT4 710 also has a data input from sixteen bits in the configuration registers for a cluster of processors containing the LUT block 730. Either the previous state of the user's modeled flip flop, Q*, or the current state that is output of the LUT4 710 is selected by multiplexer 720 to output as current value Q. The select signal to multiplexer 720 is provided by an AND gate 730, whose functional inputs are the Q enable signal $EF_Q$ and control signal $EF_T$.

Figure 7:
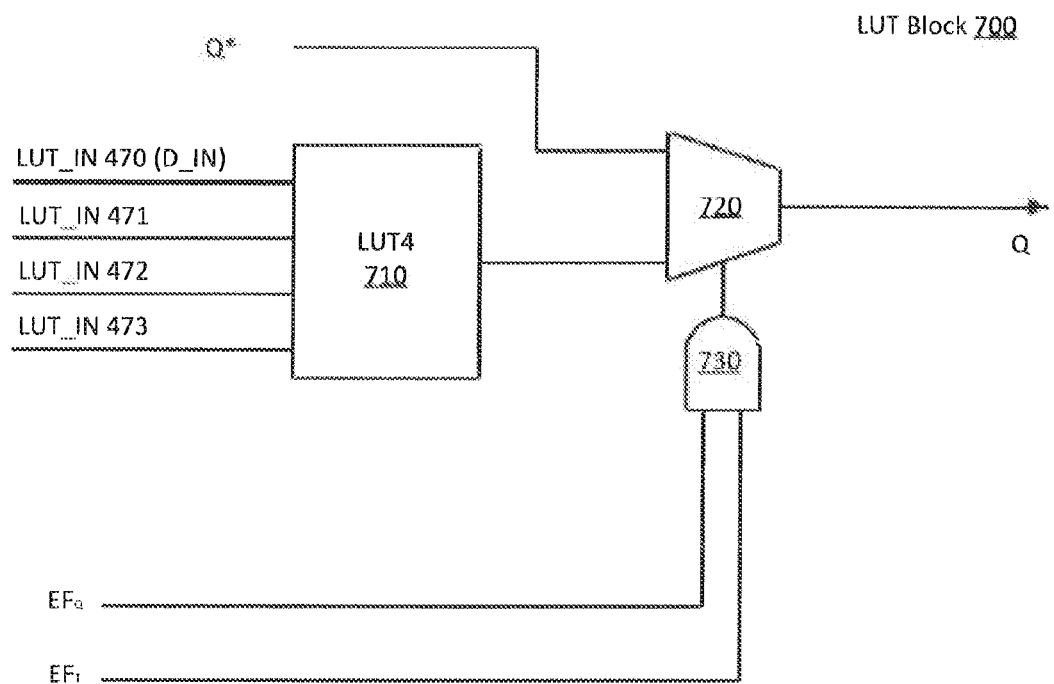
FIG. 7 illustrates a detailed view of a LUT block that does not provide set/reset functionality of a portion of the emulation chip according to another embodiment.

For this other configuration of the embodiment illustrated in FIG. 7, the DSEL[1:0] 480, which is illustrated in D* block 310 may be set to "0" so that FPO 440 is provided as LUT_N 470, FPO 441 is provided as LUT_IN 471, FPO 442 is provided as LUT_IN 472, and FPO 443 is provided as LUT_IN 473.

Figure 8:
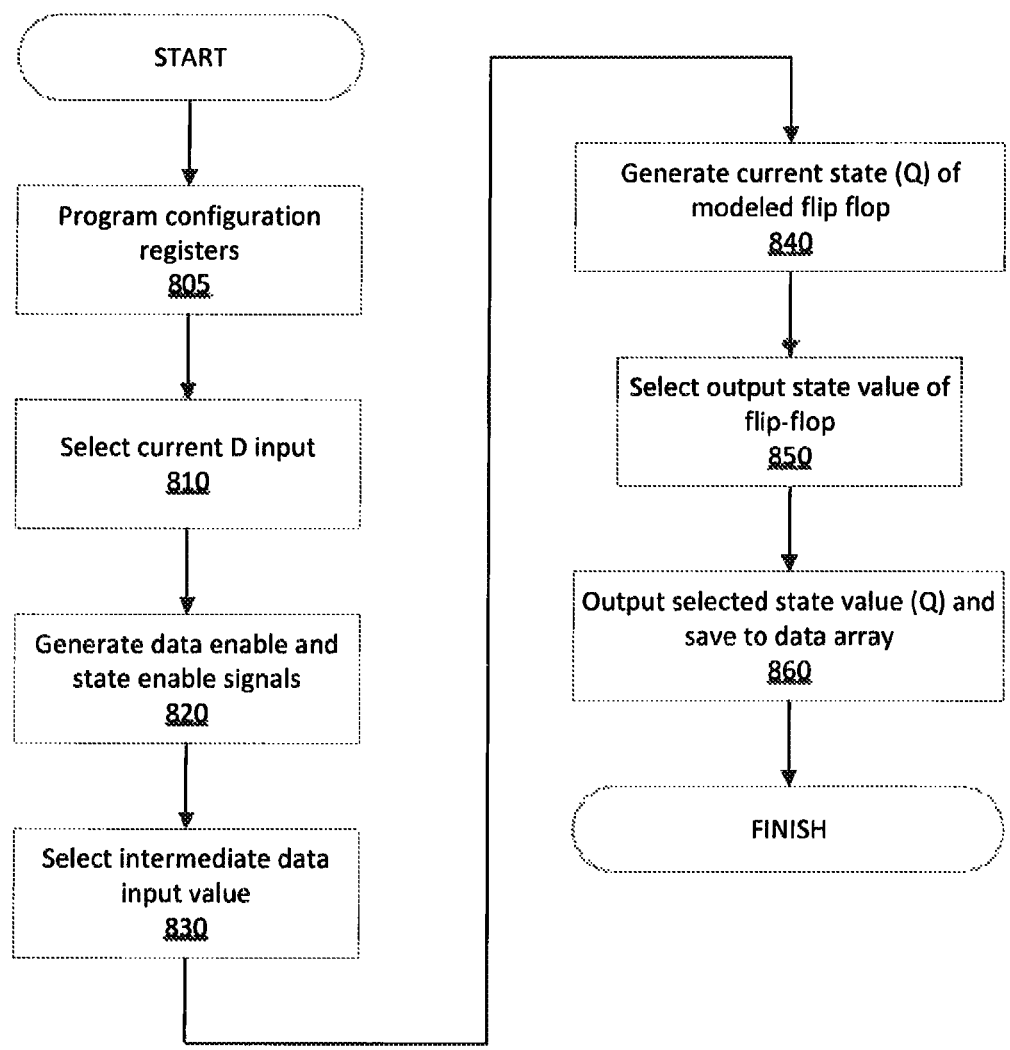
FIG. 8 illustrates a flow for modeling a user's flip flop in a hardware functional verification system according to an embodiment.

FIG. 8 illustrates a flow for modeling a user's flip flop in a processor-based hardware functional verification system 100 according to an embodiment. Prior to functional verification, the system may be configured. Most of the configuration may be performed by the system's compiler software, which is part of the emulation support software 116 running on the workstation 105 of system 100. During the configuration process, at step 805, configuration registers for each emulation chip of the system that will model a flip flop are programmed with a plurality of configuration bits, which may be organized into a one or more configuration words. Registers to determine the mode for the flip flop model, such as combined or uncombined, may also be specified during system configuration.

At step 810, the functional verification system selects as the current data input from among a plurality of inputs received from a plurality of emulation processors. Such emulation processors may be on the same emulation chip, or may originate as the output of emulation processors located on other emulation chips. At step 820 enable signal are generated in an enable block, including a data enable signal to select from one of the current data input selected in step 820 and the previous data input, stored in a data array. A state enable signal is also generated that controls the selection of a state enable signal to output from the flip flop model. At step 830 the data input (an intermediate data input) is selected according to the generated state enable signal from the current selected data input from step 810 and the previous data input. At step 840 the current state of the flip flop is generated in a LUT block using one or more LUTs. At step 850 the state (Q) of the modeled flip flop is selected from among the current state of the flip flop generating during step 850 and the previous state of the modeled flip flop as stored in the data array (that also stores the previous data (D*) input. At step 860 the state of the modeled flip flop (Q) is provided as an output and that state saved into the data array.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:

1. A processor-based hardware functional verification system into which a circuit design may be mapped, wherein the circuit design includes a flip flop to be modeled in an emulation chip of the system, comprising:
a data block to select one of a plurality of data inputs generated by a plurality of emulation processors of the hardware functional verification system as a current data input of the modeled flip flop, wherein the data block includes a data array comprising a memory to store a previously-selected data input of the modeled flip flop;
an enable block to generate one or more enable signals, at least one of the one or more enable signals being output to the data block; and
a lookup table (LUT) block that receives either the current data input or a previous data input of the modeled flip flop based on at least one of the one or more enable signals, the LUT further receives the one or more enable signals from the enable block, the LUT generates a state output signal of the modeled flip flop according to the one or more enable signals, the state output signal of the modeled flip being either a previous output of the modeled flip flop or a new output of the modeled flip flop.

2. The system of claim 1, wherein the data array further stores a previous output state of the modeled flip flop.

3. The system of claim 1, wherein the one or more enable signals comprise a state enable signal generated by a first LUT according to a first plurality of bits stored in a configuration register of the emulation chip.

4. The system of claim 3, wherein the LUT block further comprises a multiplexer to select one of a previous state of the modeled flip flop and a current state of the modeled flip flop.

5. The system of claim 1, wherein the one or more enable signals comprise a data enable signal generated by a second LUT according to a second plurality of bits stored in a configuration register of the emulation chip.

6. The system of claim 1, wherein the LUT block comprises a plurality of three-input LUTs, wherein a first of the three-input LUTs is to provide data and set/reset as a function of a plurality of flip-flop inputs for the modeled flip flop, and wherein a second of the three-input LUTs is to provide an enable signal of the one or more enable signals as a function of the plurality of flip flop inputs.

7. The system of claim 1, wherein the data block further comprises a multiplexer to select the one of a plurality of data inputs according to one or more selection bits, and one or more multiplexers to select the plurality of data inputs other than the one according to the one or more selection bits.

8. The system of claim 1, wherein the one or more enable signals comprise a data enable signal and a state enable signal generated by one or more LUTs according to a plurality of bits stored in a programmable configuration register.

9. An emulation chip into which a portion of a circuit design may be mapped during functional verification, wherein the circuit design includes a flip flop to be modeled, comprising:
a data block to select one of a plurality of data inputs generated by a plurality of emulation processors of the emulation chip as a current data input of the modeled flip flop, wherein the data block includes a data array comprising a memory to store a previously-selected data input of the modeled flip flop;
an enable block to generate one or more enable signals, at least one of the one or more enable signals being output to the data block; and
a lookup table (LUT) block that receives either the current data input or a previous data input of the modeled flip flop based on at least one of the one or more enable signals, the LUT further receives the one or more enable signals from the enable block, the LUT generates a state output signal of the modeled flip flop according to the one or more enable signals, the state output signal of the modeled flip being either a previous output of the modeled flip flop or a new output of the modeled flip flop.

10. The emulation chip of claim 9, wherein the data array further stores a previous output state of the modeled flip flop.

11. The emulation chip of claim 9, wherein the one or more enable signals comprise a state enable signal generated by a first LUT according to a first plurality of bits stored in a configuration register.

12. The emulation chip of claim 11, wherein the LUT block further comprises a multiplexer to select one of a previous state of the modeled flip flop and a current state of the modeled flip flop.

13. The emulation chip of claim 9, wherein the one or more enable signals comprise a data enable signal generated by a second LUT according to a second plurality of bits stored in a configuration register.

14. The emulation chip of claim 9, wherein the LUT block comprises a plurality of three-input LUTs, wherein a first of the three-input LUTs is to provide data and set/reset as a function of a plurality of flip-flop inputs for the modeled flip flop, and wherein a second of the three-input LUTs is to provide an enable signal of the one or more enable signals as a function of the plurality of flip flop inputs.

15. The emulation chip of claim 9, wherein the data block further comprises a multiplexer to select the one of a plurality of data inputs according to one or more selection bits, and one or more multiplexers to select the plurality of data inputs other than the one according to the one or more selection bits.

16. The emulation chip of claim 9, wherein the one or more enable signals comprise a data enable signal and a state enable signal generated by one or more LUTs according to a plurality of bits stored in a programmable configuration register.

17. A method of modelling a flip flop of a circuit design mapped into a processor-based hardware functional verification system, wherein the system comprises a data block including a data array comprising a memory to store bits associated with the modelled flip flop, an enable block in communication with the data block, and a lookup table (LUT) block in communication with the data block and the enable block, the method comprising:
   selecting as a current data input of the modeled flip flop one of a plurality of data inputs generated by a plurality of emulation processors of the system in the data block, a first of the plurality of data inputs being a data input of the modeled flip flop, a second of the plurality of data inputs being a previous data input of the modeled flip flop;
   generating a data enable signal in the enable block according to a plurality of configuration bits; and
   selecting in the data block one of a previously-selected data input of the modeled flip flop stored in the data array or the current data input of the modeled flip flop according to the data enable signal; and
   generating a current state of the modeled flip flop using at least the selected data input, the current state of the modeled flip flop being either a previous output of the modeled flip flop or a new output of the modeled flip flop.

18. The method of claim 17, further comprising generating a state enable signal in the enable block according to the plurality of configuration bits.

19. The method of claim 18, further comprising selecting in the LUT block one of a previously output state of the modeled flip flop stored in the data array and the current state of the modeled flip flop according to the state enable signal.

20. The method of claim 17, further comprising programming a configuration register with the plurality of configuration bits comprising two words, wherein a first word is received by a first LUT of the enable block to generate the data enable signal, and wherein a second word is received by a second LUT of the enable block to generate a state enable signal.

* * * * *